United States Patent [19]
Arnone et al.

[11] Patent Number: 5,694,257
[45] Date of Patent: Dec. 2, 1997

[54] ROTARY BEAMSPLITTER PRISM MOUNT

[75] Inventors: David F. Arnone, Mountain View; Francis S. Luecke, San Jose, both of Calif.

[73] Assignee: New Focus, Inc., Santa Clara, Calif.

[21] Appl. No.: 646,723

[22] Filed: May 6, 1996

[51] Int. Cl.⁶ .................................................. G02B 7/02
[52] U.S. Cl. .................................... 359/822; 359/831
[58] Field of Search .............................. 359/822, 819, 359/831, 640, 814

[56] References Cited

U.S. PATENT DOCUMENTS

| | | | |
|---|---|---|---|
| 4,088,396 | 5/1978 | Edelstein | 359/822 |
| 4,519,674 | 5/1985 | Buckley et al. | 359/831 |
| 5,138,496 | 8/1992 | Pong | 359/822 |
| 5,267,089 | 11/1993 | Yamamoto et al. | 359/822 |
| 5,343,332 | 8/1994 | Oono et al. | 359/831 |
| 5,502,598 | 3/1996 | Kimura et al. | 359/814 |
| 5,508,851 | 4/1996 | Tachigawa | 359/822 |

*Primary Examiner*—Loha Ben
*Attorney, Agent, or Firm*—Hugh D. Jaeger

[57] ABSTRACT

Rotary beamsplitter prism mount providing individually adjustable rotation about three axes where adjustment about one axis does not significantly affect the remaining axis with respect to beam emergence.

11 Claims, 12 Drawing Sheets

ROTARY BEAMSPLITTER PRISM MOUNT

BACKGROUND OF THE INVENTION

1. Field of the Invention

The present invention relates to a mounting device for optical systems, and more particularly, pertains to a mount having three axis of rotational freedom for use with a beamsplitter prism.

2. Description of the Prior Art

Most of the prior art systems for mounting a beamsplitter have adjustments which have substantial interaction, which makes alignment a lengthy, iterative, process. Since each adjustment has an effect on the other adjustments, it is necessary to go back to the previous adjustments and make successively finer manipulations until the system comes into alignment. The prior art systems are capable of accurate alignment, but it takes an undue amount of time to achieve this end result.

Ideally, the mount for a beamsplitter should be capable of rotary motion about a vertical axis passing through the center of the prism without inducing any rotation about the axes parallel to the emerging or the incident beam. The device should also be capable of rotary motion about an axis transverse to the emergent beam without inducing any rotation about the vertical axis or the axis parallel to the emergent beam. Finally, the device should be capable of rotary motion about an axis parallel to the emergent beam without inducing any rotation about the vertical axis or the axis transverse to the emergent beam. It will be appreciated that the range of rotary motion need not be large since the mount itself provides a fairly accurate positioning of the prism.

SUMMARY OF THE INVENTION

The general purpose of the present invention provides an optical mount with three axii of rotational freedom in which rotational adjustment along any one of the rotary axes is largely independent of the other two. By allowing adjustment of each axis to be made independently, and without effect on either of the other two, it is possible to align the beamsplitting cube with a single adjustment of each axis. In other words, the independent nature of the motion about each of the three axes means that the adjustment of one does not affect the position of another so that there is no need to go back and "touch-up" the previously aligned axes.

This desirable characteristic is achieved by a fixed base plate, affixed to an optical bench or like device, which supports a movable plate by first, second and third balls. The first ball is positioned between the base plate and the mounting plate directly below the center of the mounting plate and accommodates rotary motion about the center of the beamsplitter and also serves as a pivot point for lateral and transverse rotation induced by movement of the second and third balls toward or away from the fixed base plate. Rotation about the vertical axis is induced by motion of a fourth ball, which moves in a general circumferential direction. The base plate and the mounting plate are held in engagement with the first, second and third balls by means of a first tension spring positioned within the triangle defined by these balls. A second tension spring holds the mounting plate against the fourth ball. The second, third and fourth balls are positions by means of adjustment screws passing through threaded holes in the base plate.

One object of the present invention to provide an adjustable mount for a beamsplitting prism or similar device.

Another object of the present invention to provide an adjustable mount for a beamsplitting prism or similar device which allows for independent and non-interactive rotational motion about three mutually perpendicular axes.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
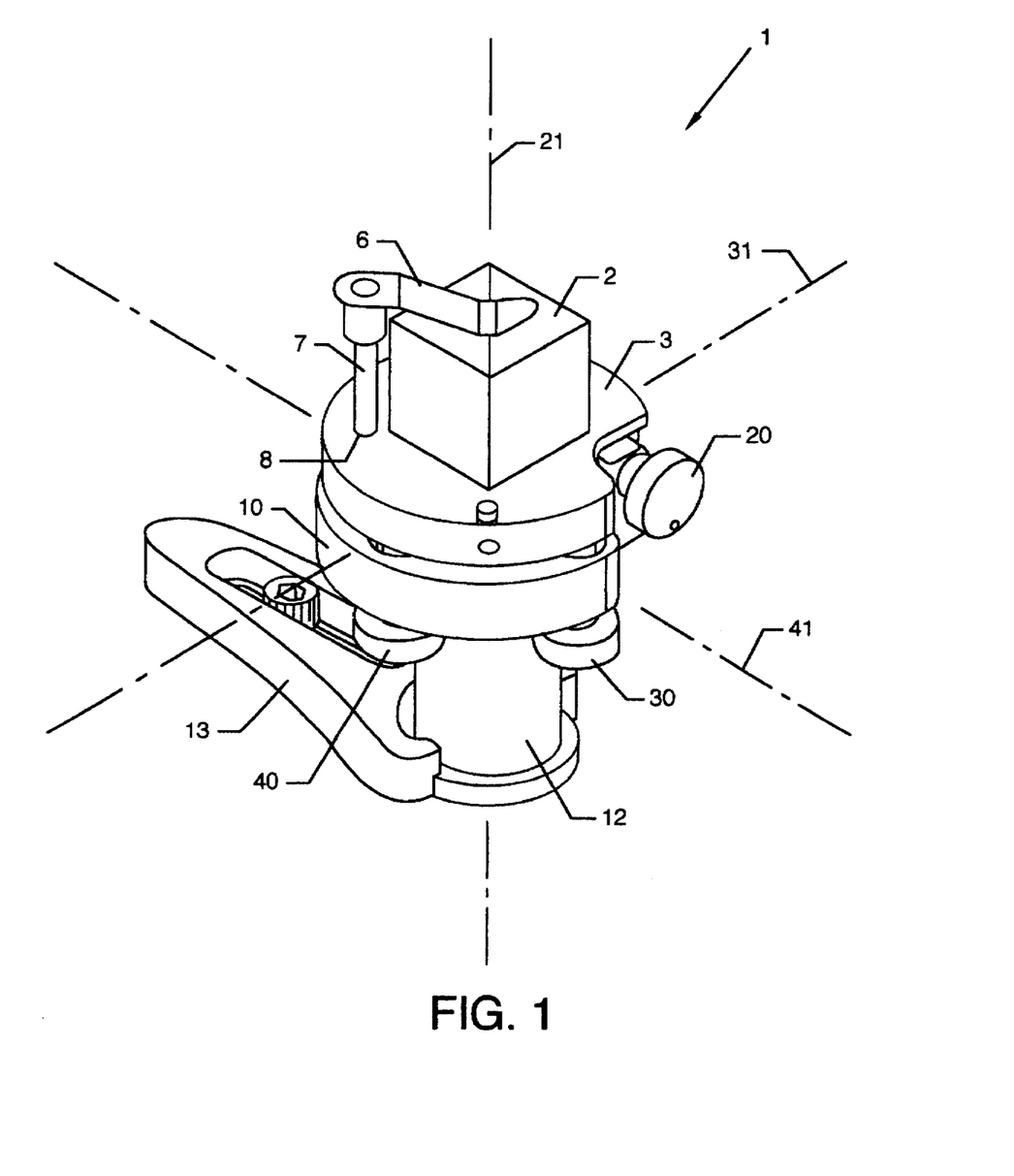
FIG. 1 illustrates an isometric view of the optical mount of the present invention with a beamsplitting prism positioned on the movable plate.

FIG. 1 illustrates a three axis of rotational freedom mount 1 having a beamsplitting prism 2 held in position on movable stage plate member 3 by means of spring clamp 6 supported on post 7. Movable stage plate member 3 is supported by fixed base plate member 10 is a fashion to be later described. A mounting post 12 and clamp device 13 serve to affix mount 1 to an optical bench, which is not shown. Rotation adjustment screw 20 provides for rotational movement about the vertical axis 21. Transverse tilt adjustment screw 30 provides for rotational movement about transverse axis 31. Parallel tilt adjustment screw 40 provides for rotational movement about parallel axis 41.

Figure 2:
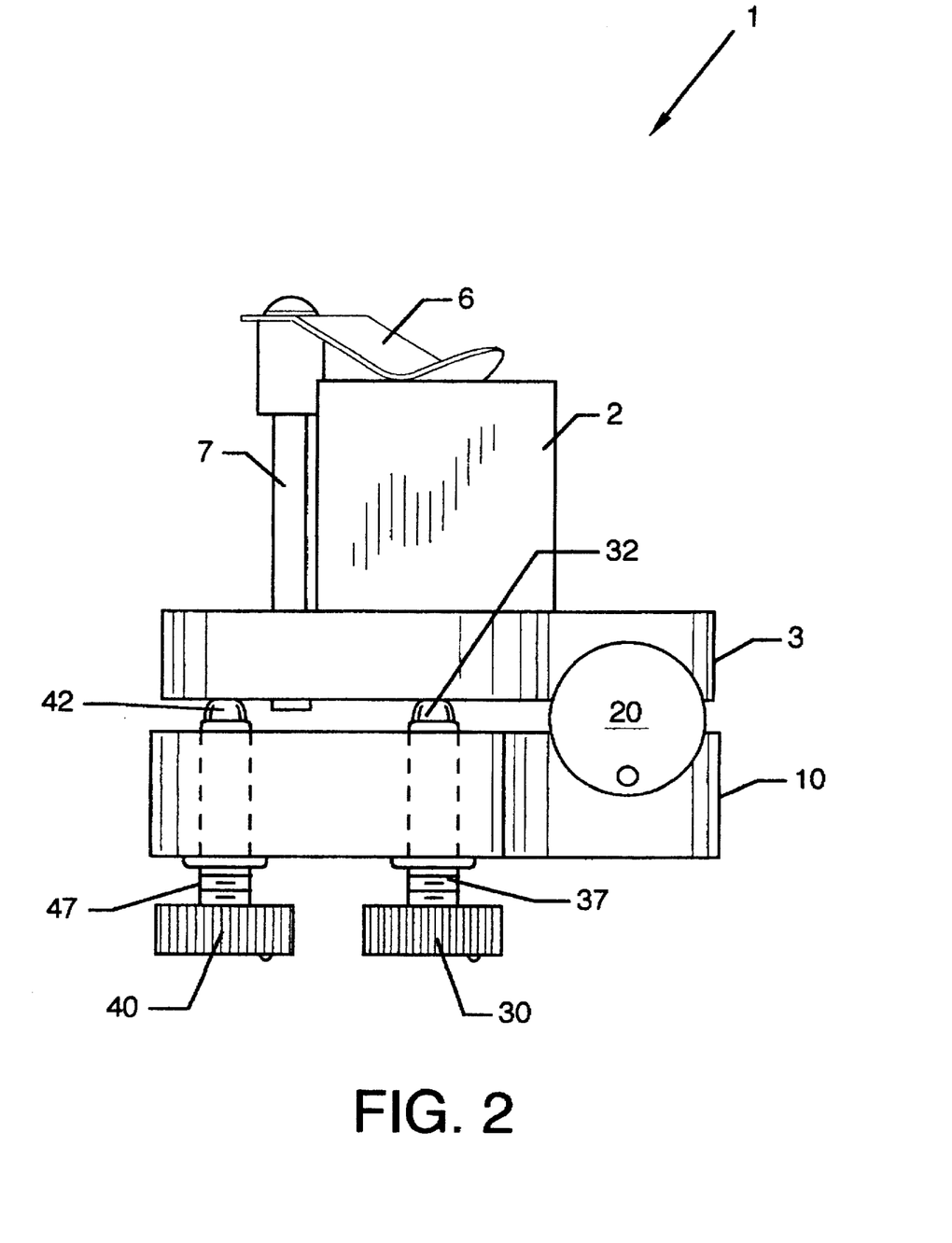
FIG. 2 illustrates a front view of the optical mount.

FIG. 2 illustrates a side view of mount 1 illustrating the fashion in which transverse tilt adjustment screw 30 and parallel tilt adjustment screw 40 pass through threaded holes in base plate member 10 to bear against second transverse tilt ball member 32 and parallel tilt ball member 42.

Figure 3:
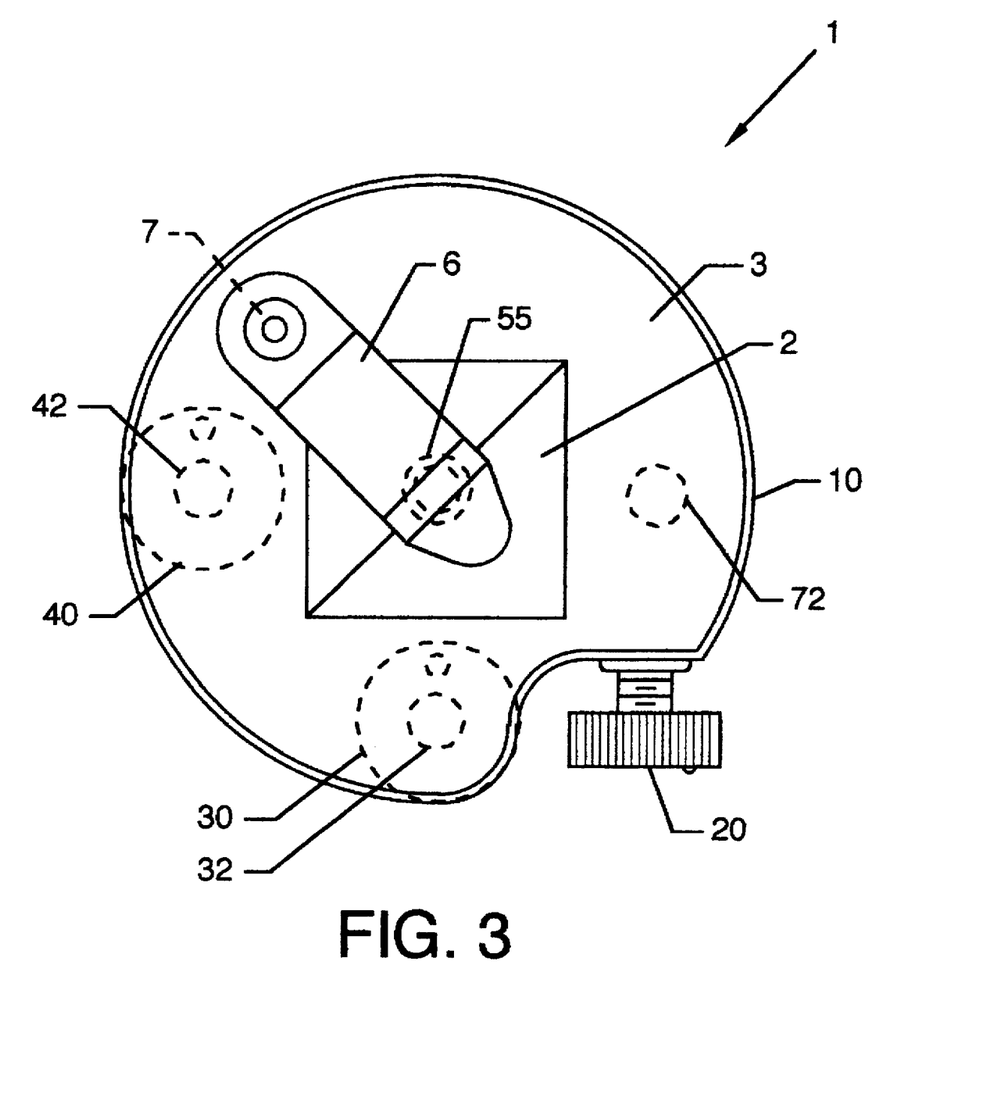
FIG. 3 illustrates a top view of the optical mount.

FIG. 3 illustrates a top view of the optical mount 1, where all numerals correspond to those elements previously described.

Figure 4:
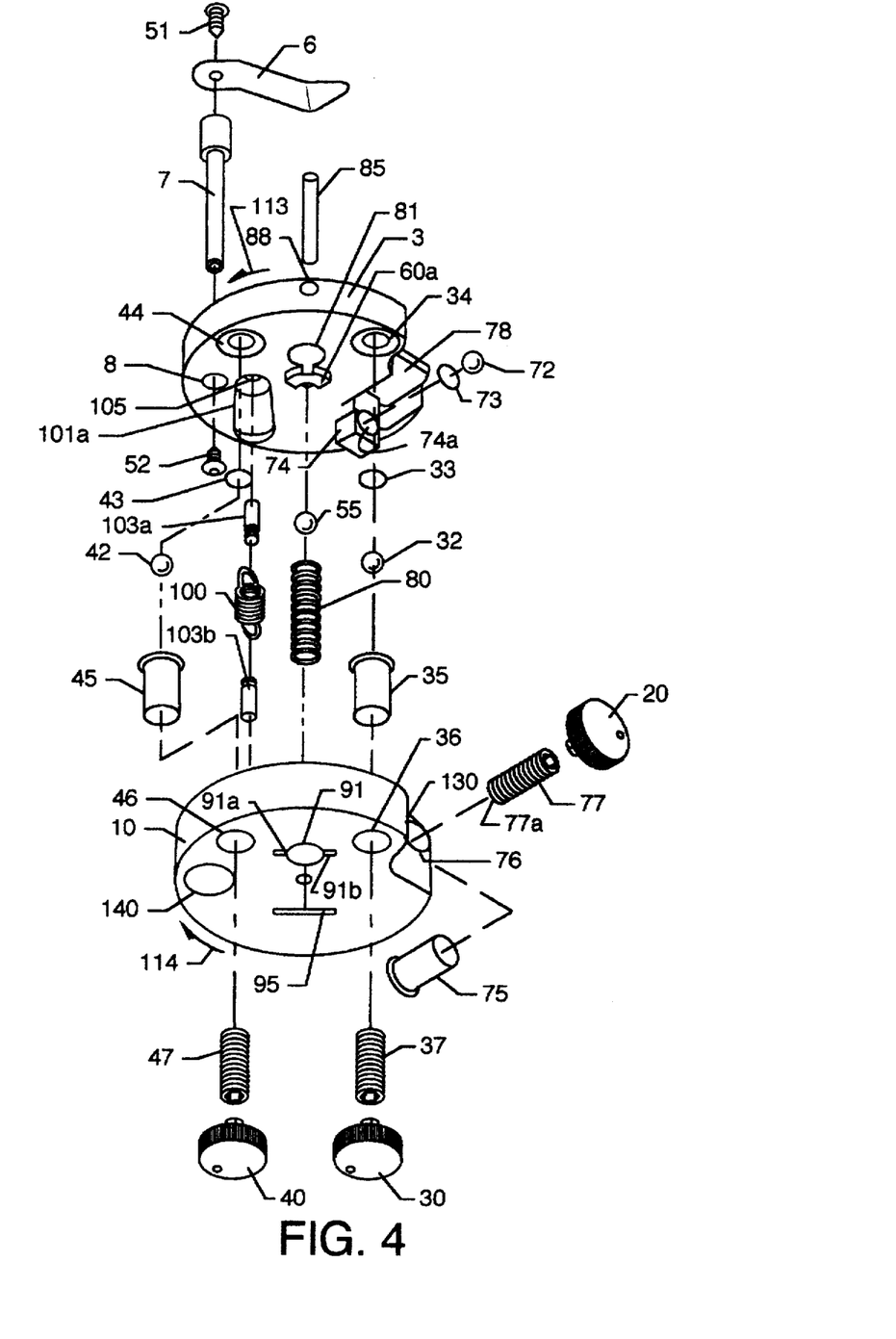
FIG. 4 illustrates an exploded isometric view showing the support balls between the base plate and the stage plate member.

FIG. 4 illustrates an exploded view of mount 1 which illustrates the fashion in which screws 51 and 52 are utilized to hold clamp 6 to post 7 and post 7 to hole 8 in movable stage plate member 3. The first, pivot, ball member 55 is positioned in the center of movable stage plate 3 and retained by a quarter circle retainer 60a on stage plate member 3 and a complementary quarter circle retainer 60b (see FIG. 9) on base plate member 10.

A second, transverse tilt, ball member 32 bears against sapphire pad 33 positioned at the bottom of retaining hole 34. A threaded insert 35 mounted in hole 36 of base plate member 10 accommodates threaded portion 37 of transverse tilt adjustment screw 30.

A third, parallel tilt, ball member 42 bears against sapphire pad 43 positioned at the bottom of retaining hole 44. A threaded insert 45 mounted in hole 46 of base plate member 10 accommodates threaded portion 47 of parallel tilt adjustment screw 40.

A fourth, rotation, ball member 72 bears against sapphire pad 73 positioned on the abutting face 74a of shoulder member 74. A threaded insert 75 mounted in hole 76 of base plate member 10 accommodates threaded portion 77 of rotation adjustment screw 20. Pocket 78 on the stage plate member 3 provides clearance for the raised shoulder 130 of base plate 10.

Movable stage plate 3 and base plate 10 are held together, in mutual engagement with adjustment balls 32, 42 and 55, by means of spring 80, which is affixed to stage plate 3 through hole 81 by means of spring mount pin 85, which is positioned within hole 88, extending through the wall of stage plate 3 into hole 81. The opposite end of spring 80 is affixed to base plate 10 through hole 91 be means of spring mount pin 95, which fits into slots 91a and 91b at the periphery of hole 91.

Second spring means 100 is mounted within slot 101a (see FIG. 6) in stage plate 3 and slot 101b (see FIG. 9) in base plate 10 by means of spring mount pins 103a and 103b, respectively. Pin 103a is inserted into hole 105 at the interior end of slot 101a (see FIG. 6) in stage plate 3. Pin 103b is inserted into hole 106 at the exterior end of slot 101b (see FIG. 9) in base plate 10. The action of second spring means 100 tends to rotate stage plate 3 and base plate 10 in opposite directions, as shown by the arrows 113 and 114, biasing the end 77a, of rotation adjustment screw 20, against ball member 72 and thereby force ball member 72 against sapphire pad 73.

Figure 5:
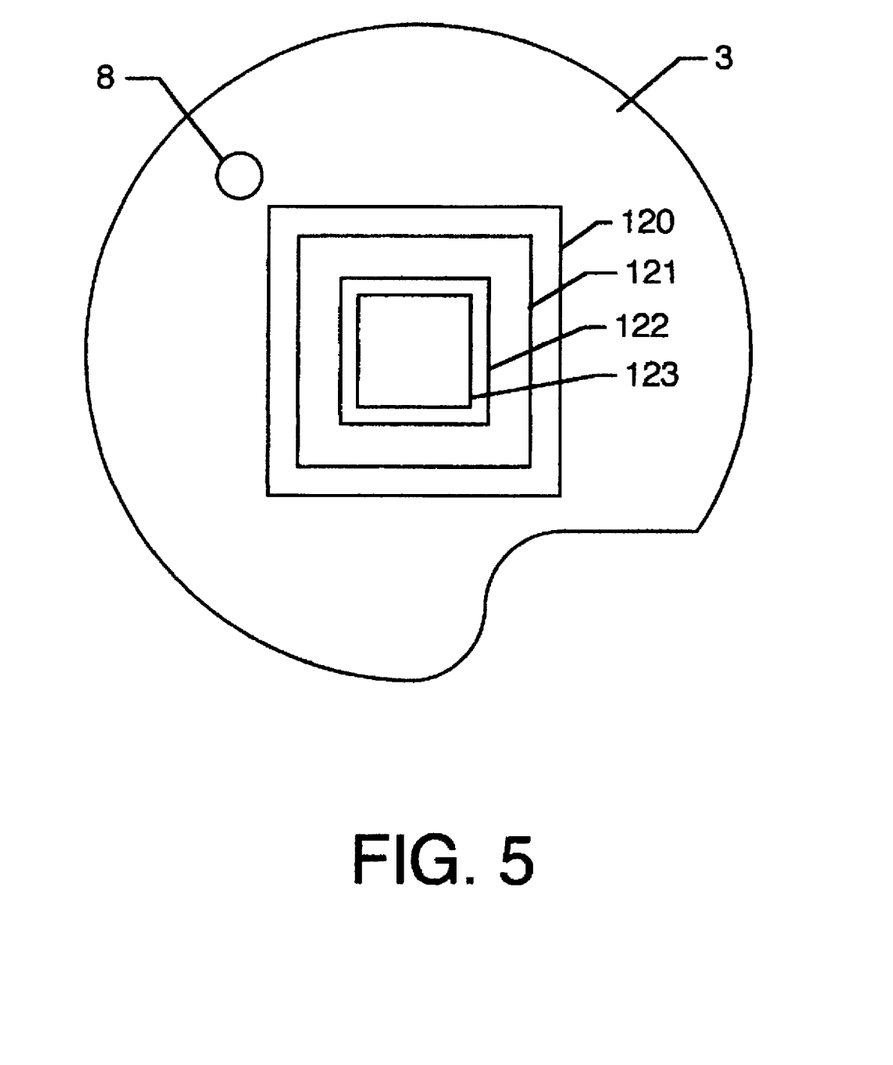
FIG. 5 illustrates a top view of the stage plate member illustrating the alignment squares for the positioning of beamsplitting prisms of different sizes.

FIG. 5 illustrates a top view of the stage plate member 3, where all numerals correspond to those elements previously described.

Since the mount is particularly well suited for use with square based beamsplitter prisms, the upper surface of stage plate 3 carries alignment markings. The series of squares 120, 121, 122 and 123 are centered above pivot ball member 55 to facilitate placement of the prism center directly on the axis of rotation about pivot ball member 55. Once in place, spring clamp 7 is positioned to retain the prism in place.

Figure 6:
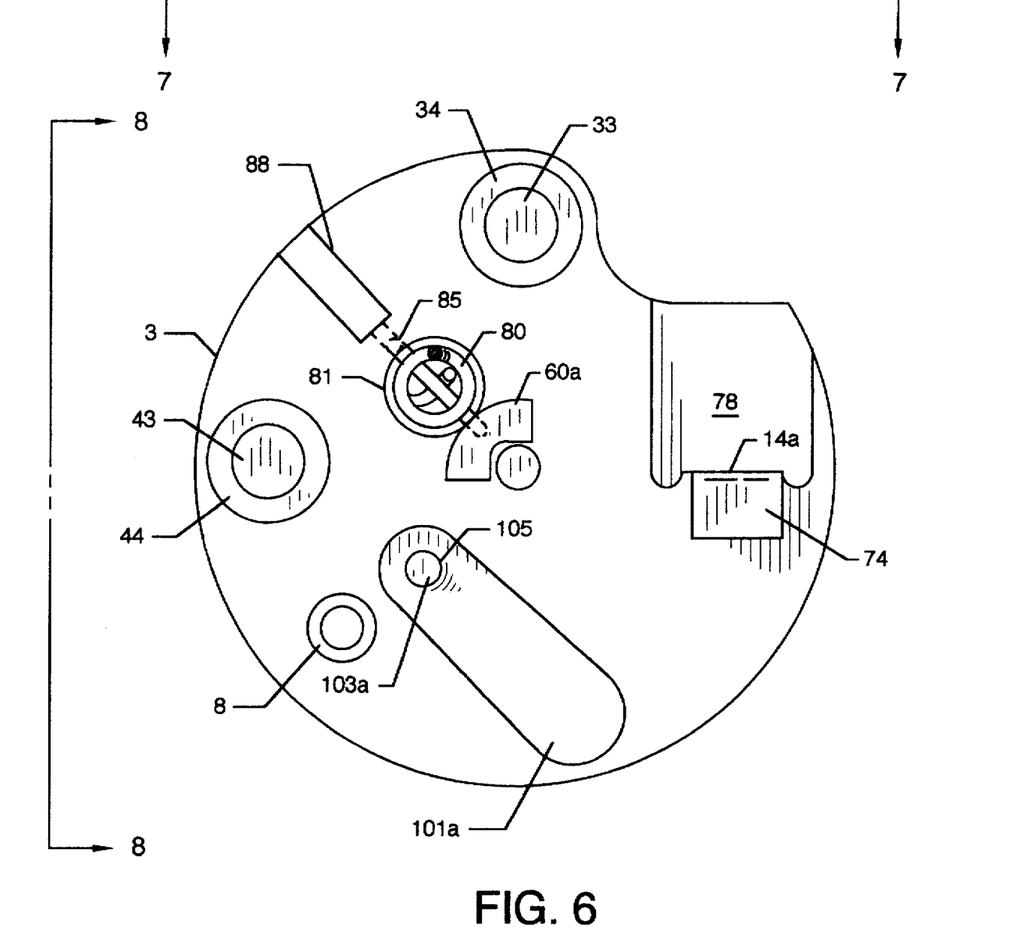
FIG. 6 illustrates a bottom view of the stage plate member.

FIG. 6 illustrates a bottom or abutting surface of stage plate member 3, illustrating the relationship between the locations of the first quarter circle retainer 60a, the sapphire pad 33 in hole 34, and the sapphire pad 43 in hole 44 for alignment of pivot balls 55, 32 and 42, respectively. It can be seen that the arrangement forms a right isosceles triangle with quarter circle retainer 60a and the intersection of the equal length sides between the radial center of the quarter circle retainer 60a and the center of the holes 34 and 44 and corresponding sapphire pads. The location of first tension spring means 80 in hole 81 is also shown. Hole 81 is positioned on a line which bisects the right angle and is close to the center of the isosceles triangle so as to place equal forces on all three ball members 32, 42 and 55, illustrated in FIG. 4.

Figure 7:
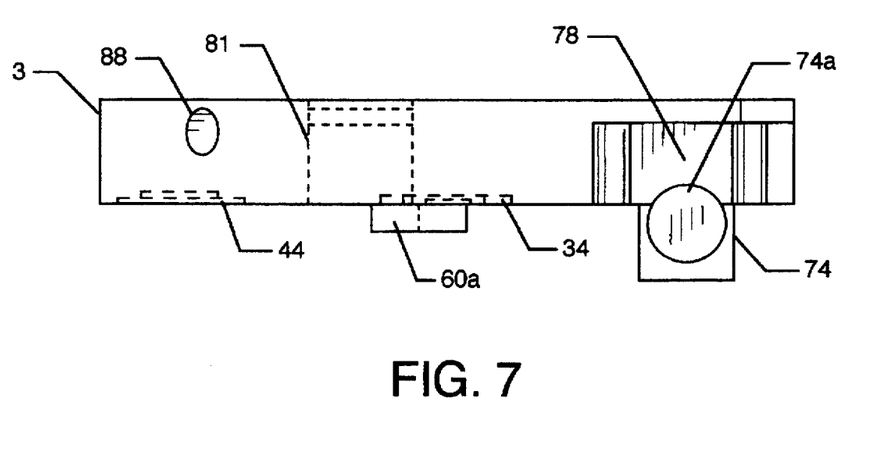
FIG. 7 illustrates a front view of the stage plate member along line 7—7 of FIG. 6.
Figure 8:
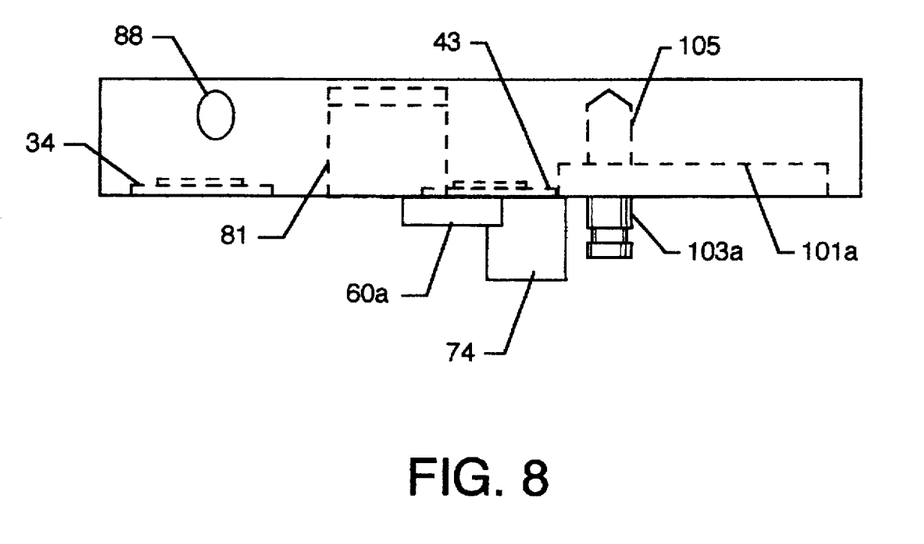
FIG. 8 illustrates a side view of the stage plate member along line 8—8 of FIG. 6.

FIGS. 7 and 8 are front views, respectively, taken from the position of the rotation adjust screw 20 along view lines 7—7 and 8—8 of FIG. 6, where all numerals correspond to those elements previously described.

Figure 9:
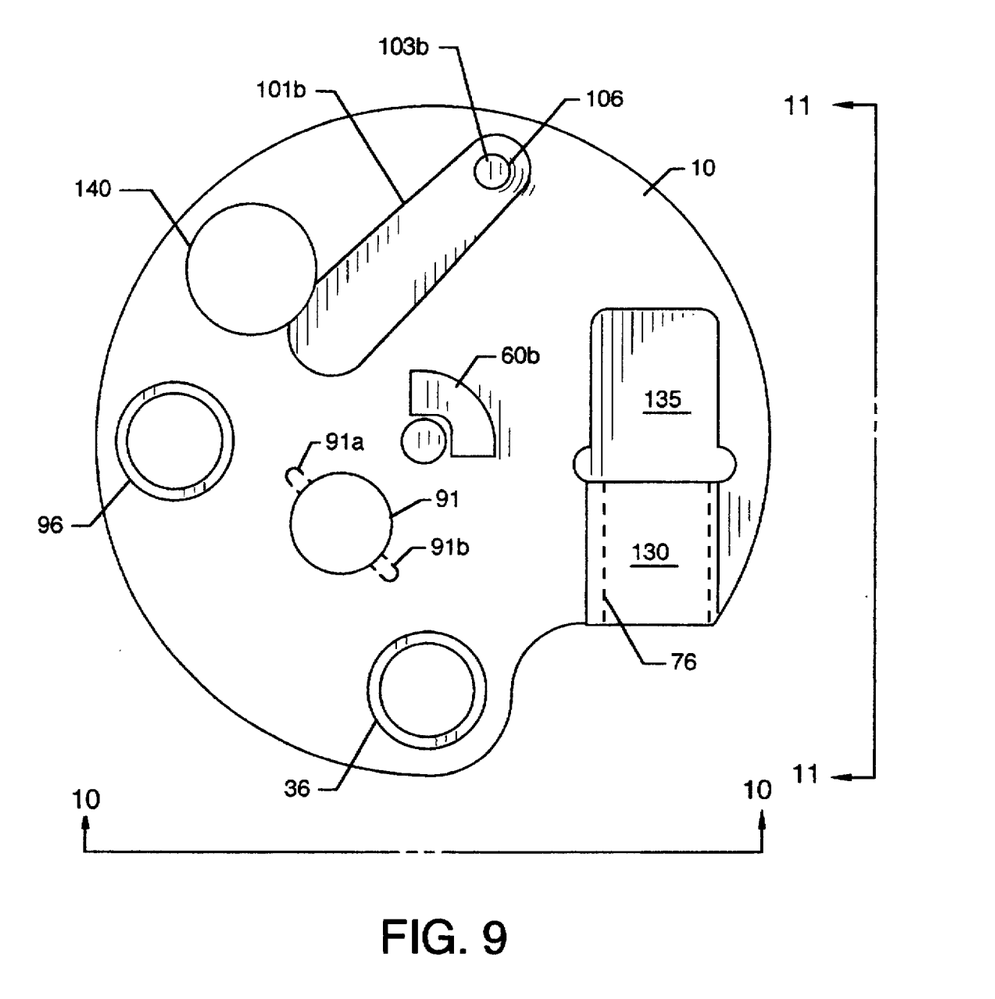
FIG. 9 illustrates a top view of the base plate member.

FIG. 9 illustrates a top view of base plate member 10, that is, the side which abuts stage plate 3. The slot 101b accommodates spring 100 and mounting pin 103b which fits into hole 106. Hole 91 aligns to hole 81 in the stage plate 3 accommodates tension spring 80, as illustrates in FIG. 6. The holes 36 and 96 accommodate the threaded inserts 35 and 95, respectively, as illustrated in FIG. 4. The raised shoulder 130 includes hole 76 which accommodates threaded insert 75, shown in FIG. 4, for rotation adjustment screw 20. A pocket area 135 provides space for the raised shoulder portion 74 on stage plate 3.

Slots 91a and 91b on opposite sides of hole 91, provide for the retention of spring mount spring 95. Access hole 140 provides access to screw 52 which retains clamp post 7 against stage plate 3.

Figure 10:
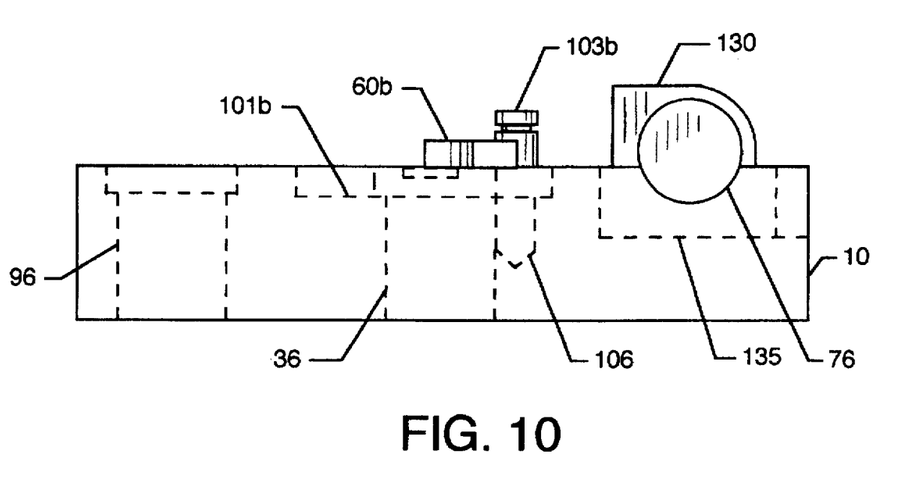
FIG. 10 illustrates a front view of the base plate member along line 10—10 of FIG. 9.
Figure 11:
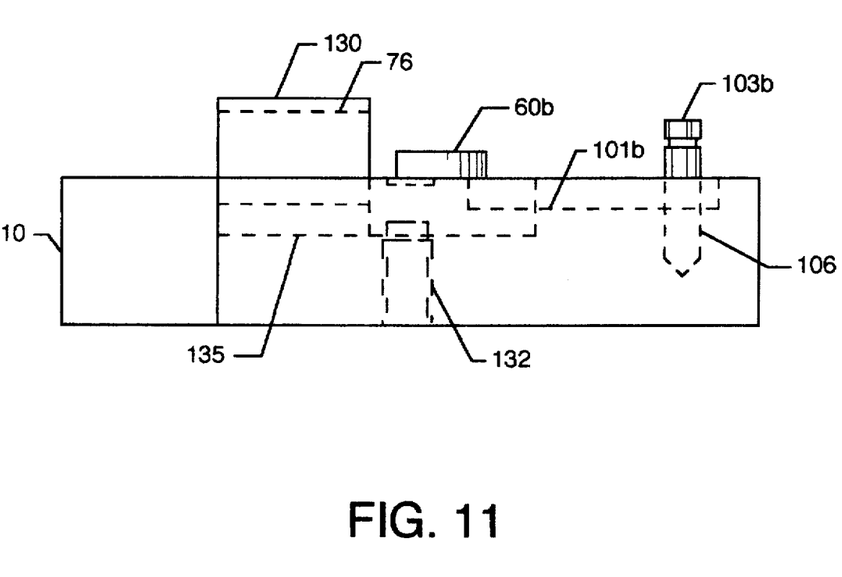
FIG. 11 illustrates a side view of the base plate member along line 11—11 of FIG. 9; and, FIG. 12 illustrates a bottom view of the mounting plate member.

FIGS. 10 and 11 illustrate a front view and a side, respectively, along view lines 10—10 and 11—11 of FIG. 9 of base plate member 10, where all numerals correspond to those elements previously described. In FIG. 11, a mounting hole 132 is illustrated extending vertically into the base plate member 10 for securation to the mounting post 12, as illustrated in FIG. 1.

Figure 12:
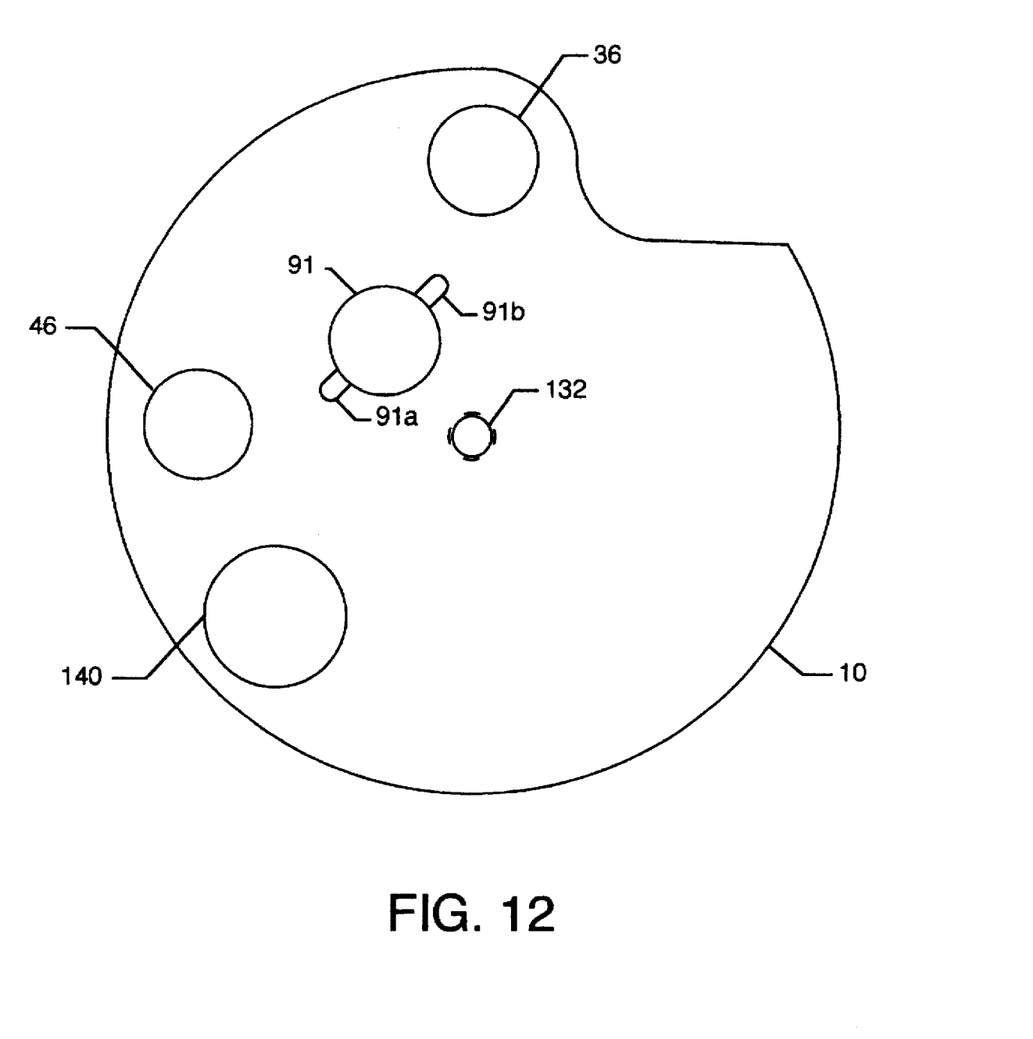

FIG. 12 illustrates a bottom view of base plate member 10. Access hole 140 is located so the clamp post mounting screw 52 may be reached after the mount is assembled. Slots 91a and 91b, on opposite sides of hole 91, serve to retain spring mount pin 95.

MODE OF OPERATION

The moving ball members 32 and 42 are driven by their respective adjustment screws 30 and 40 in a direction parallel to a line through fixed ball member 55 and the center of the beamsplitting prism mounted in the center of the upper face of stage plate 3, as shown in FIG. 5. The ball member 32 (screw member 30) and the ball member 42 (screw member 40) are positioned at 90 degrees with respect to each other with the fixed ball 55 at the vertex. Ball members 32 and 42 bear against a flat, preferably sapphire, surface on stage plate 3. Adjustment of screw 30 or screw 40 produces a rotation of the beamsplitter about a horizontal axis passing through the fixed ball. Since the adjustments are typically quite small, the motion produced by one screw does not affect the other axis.

A limited range of rotational adjustment about a vertical axis passing through fixed ball member 55 is provided by adjustment screw 20, positioned for tangential movement against shoulder 74 on stage plate 3 to create radial movement about the vertical axis of stage plate 3.

Various modifications can be made to the present invention without departing from the apparent scope hereof.

| ROTARY BEAMSPLITTER PRISM MOUNT PARTS LIST | | | |
|---|---|---|---|
| 1 | mount | 51 | screw |
| 2 | beamsplitting prism | 52 | screw |
| | | 55 | pivot ball |
| 3 | stage plate member | 60a | quarter circle retainer |
| 6 | spring clamp | | |
| 7 | post | 72 | rotational ball member |
| 8 | hole | | |

-continued

ROTARY BEAMSPLITTER PRISM MOUNT
PARTS LIST

| 10 | base plate member | 73 | sapphire pad |
|----|----|----|----|
| 12 | mounting post | 74 | shoulder member |
| 13 | clamp device | 74a | abutting face |
| 20 | rotation adjustment screw | 75 | threaded insert |
|    |    | 76 | hole |
| 21 | vertical axis | 77 | threaded portion |
| 30 | transverse tilt adjustment screw | 77a | threaded portion end |
|    |    | 78 | pocket |
| 31 | transverse axis | 80 | spring |
| 32 | transverse tilt ball | 81 | hole |
|    |    | 85 | spring mount pin |
| 33 | sapphire pad | 88 | hole |
| 34 | retaining hole | 91 | hole |
| 35 | threaded insert | 95 | spring pin |
| 37 | threaded portion | 100 | spring means |
| 40 | parallel tilt adjustment screw | 101a–b | slot |
|    |    | 103a–b | spring mount pin |
| 41 | parallel axis | 105 | hole |
| 42 | parallel tilt ball | 106 | hole |
| 45 | threaded insert | 113 | rotation arrow |
| 46 | hole | 114 | rotation arrow |
| 47 | threaded portion | 130 | raised shoulder |
|    |    | 132 | mounting hole |
|    |    | 140 | access hole |

We claim:

1. A three degree of rotational freedom mount for an optical element comprising:

a. a base plate member for securing to an optical bench or base plate;
   b. a movable stage plate member;
   c. a first, pivot, ball member retained in a first, central, location between said base member and said stage member;
   d. a second, transverse tilt, ball member retained in second location displaced radially from said pivot ball member and retained between said base plate member and said stage plate member;
   e. a third, parallel tilt, ball member retained in a third location displaced radially from said pivot ball member and retained between said base plate member and said stage plate member;
   f. said first, second and third locations comprising a right triangle with equal distances between said first and second and said first and third locations;
   g. first tension spring means positioned between, and affixed to, said stage plate member and said base plate member at corresponding locations within the boundary of said right triangle to urge said stage plate member and said base plate member toward each other;
   h. shoulder means located on the side of said stage plate member facing said base plate member;
   i. second spring means positioned between, and affixed to, said stage plate member and said base plate member at displaced locations, outside of said boundary of said right triangle to urge said stage plate member and said base plate member to rotate relative to each other about a first, rotational, axis perpendicular to said stage plate member and passing through said first pivot ball member;
   j. a rotation adjustment screw, positioned in a threaded hole in said base plate member for engagement with said shoulder means on said stage plate member, for providing rotational movement of said stage plate member about said first axis passing through said first, pivot, ball member;
   k. a transverse tilt adjustment screw positioned in a threaded hole in said base plate member for engagement with said second, transverse tilt, ball member to rotate said stage plate member around a second axis defined by said first and third ball members; and,
   l. a parallel tilt adjustment screw positioned in a threaded hole in said base plate member for engagement with said third, parallel tilt, ball member to rotate said stage plate member around a third axis defined by said first and second ball members.

2. A mount according to claim 1, wherein said first tension spring means is positioned on a line which bisects the right angle of said triangle.

3. A mound according to claim 2, wherein said first tension spring means is positioned at a point on the line bisecting the right angle which is closer to the first ball member than to the hypotenuse of said right triangle.

4. A mount according to claim 1, wherein said second spring means is a tension spring.

5. A mount according to claim 4, wherein said second tension spring is positioned within a slot in said stage plate member.

6. A mount according to claim 5, wherein said second tension spring is affixed to said stage plate member at a first distance from said first ball member and to said base plate member at a second, greater distance from said first ball member.

7. A mount according to claim 1, further including a fourth ball means positioned between said rotation adjustment screw and said shoulder means.

8. A mount according to claim 7, wherein said first, second, third and fourth ball means have the same diameter.

9. A mount according to claim 8, wherein said first, second, third and fourth ball means lie in a common plane.

10. A mount according to claim 1, wherein said rotation adjustment screw applies a tangential force to said shoulder means on said stage plate member.

11. A three degree of rotational freedom mount comprising:

a. a base plate member for securing to an optical bench or base plate;
   b. a movable stage plate member;
   c. a first, pivot, ball member retained in a first, central, location between said base member and said stage member;
   d. a second, transverse tilt, ball member retained in second location displaced radially from said pivot ball member and retained between said base plate member and said stage plate member;
   e. a third, parallel tilt, ball member retained in a third location displaced radially from said pivot ball member and retained between said base plate member and said stage plate member;
   f. said first, second and third locations comprising a right triangle with equal distances between said first and second and said first and third locations;
   g. first tension spring means positioned between, and affixed to, said stage plate member and said base plate member at corresponding locations within the boundary of said right triangle to urge said stage plate member and said base plate member toward each other;
   h. shoulder means located on the side of said stage plate member facing said base plate member;
   i. second spring means positioned between, and affixed to, said stage plate member and said base plate member at displaced locations, outside of said boundary of said right triangle to urge said stage plate member and said base plate member to rotate relative to each other about a first, rotational, axis perpendicular to said stage plate member and passing through said first pivot ball member;

j. a rotation adjustment screw, positioned in a threaded hole in said base plate member for engagement with said shoulder means on said stage plate member, for providing rotational movement of said stage plate member about said first axis passing through said first, pivot, ball member;

k. a transverse tilt adjustment screw positioned in a threaded hole in said base plate member for engagement with said second, transverse tilt, ball member to rotate said stage plate member around a second axis defined by said first and third ball members; and, l. a parallel tilt adjustment screw positioned in a threaded hole in said base plate member for engagement with said third, parallel tilt, ball member to rotate said stage plate member around a third axis defined by said first and second ball members.

* * * * *